United States Patent
Fukae (10) Patent No.: US 10,658,835 B2
(45) Date of Patent: May 19, 2020

(54) POWER SUPPLY DEVICE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

(72) Inventor: Kazushi Fukae, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/301,620

(22) PCT Filed: May 15, 2017

(86) PCT No.: PCT/JP2017/018162
§ 371 (c)(1),
(2) Date: Nov. 14, 2018

(87) PCT Pub. No.: WO2017/208792
PCT Pub. Date: Dec. 7, 2017

(65) Prior Publication Data
US 2019/0173274 A1 Jun. 6, 2019

(30) Foreign Application Priority Data
May 31, 2016 (JP) .................. 2016-108349

(51) Int. Cl.
*H02H 7/00* (2006.01)
*H01M 10/44* (2006.01)
(Continued)

(52) U.S. Cl.
CPC .............. *H02H 7/00* (2013.01); *H01M 2/348* (2013.01); *H01M 10/425* (2013.01);
(Continued)

(58) Field of Classification Search
CPC .......... H02H 7/00; H01M 2/348; H02J 1/102; H02J 7/0068
(Continued)

(56) References Cited

U.S. PATENT DOCUMENTS 5,814,972 A * 9/1998 Shimada ................. H02J 9/061
    320/132
5,909,142 A * 6/1999 Kawasaki ............... G05F 1/465
    327/525
(Continued)

FOREIGN PATENT DOCUMENTS

JP     2009189214 A    8/2009
JP     2014184752 A    10/2014

OTHER PUBLICATIONS

International Search Report, Application No. PCT/JP2017/018162 dated Jun. 20, 2017.

*Primary Examiner* — Alfonso Perez Borroto
(74) *Attorney, Agent, or Firm* — Honigman LLP (57) ABSTRACT

The present invention realizes a power supply device that can, even if an abnormality occurs in a power supply unit, block a current from flowing into the path from the other power supply unit. A power supply device (1) includes: a first conductive path (31) that is a path for power between a first power supply unit (91) and a load (94); a second conductive path (32) that is connected to the first conductive path (31) and to a second power supply unit (92); a first switch unit (34) that is provided on the first conductive path (31) between a connection part (33), at which the first conductive path (31) is connected to the second conductive path (32), and the first power supply unit (91), and switches (Continued)

to an electrically disconnected state, in which the first switch unit (34) blocks a current from flowing in either direction, and to an electrically connected state, in which the first switch unit (34) allows a current to flow therethrough; a second switch unit (35) that is provided on the second conductive path (32) between the connection part (33) and the second power supply unit (92), and switches to an electrically disconnected state, in which the second switch unit (35) blocks a current from flowing in either direction, and to an electrically connected state, in which the second switch unit (35) allows a current to flow therethrough; and a control unit (39) that controls respective switching operations of the first switch unit (34) and the second switch unit (35).

6 Claims, 5 Drawing Sheets

(51) Int. Cl.
| | | |
|---|---|---|
| *H01M 10/48* | (2006.01) | |
| *H02J 1/06* | (2006.01) | |
| *H02J 1/10* | (2006.01) | |
| *H02J 9/06* | (2006.01) | |
| *H01M 2/34* | (2006.01) | |
| *H01M 10/42* | (2006.01) | |
| *H01M 10/46* | (2006.01) | |
| *H02H 1/00* | (2006.01) | |
| *H02J 7/00* | (2006.01) | |
| *H02J 1/00* | (2006.01) | |

(52) U.S. Cl.
CPC ........... *H01M 10/44* (2013.01); *H01M 10/46* (2013.01); *H01M 10/48* (2013.01); *H02H 1/0007* (2013.01); *H02J 1/06* (2013.01); *H02J 1/102* (2013.01); *H02J 7/0068* (2013.01); *H02J 9/06* (2013.01); *H01M 2010/4271* (2013.01); *H01M 2200/103* (2013.01); *H02J 2001/008* (2013.01)

(58) Field of Classification Search
USPC .......................................................... 307/64
See application file for complete search history.

(56) References Cited

U.S. PATENT DOCUMENTS

| | | | |
|---|---|---|---|
| 9,362,742 B2* | 6/2016 | Kayama | H02J 1/00 |
| 9,921,599 B2* | 3/2018 | Katsumata | G05F 3/262 |
| 2010/0225169 A1 | 9/2010 | Hanawa et al. | |
| 2015/0256166 A1* | 9/2015 | Saito | H03K 5/1532 |
| | | | 327/58 |

* cited by examiner

Normal State

| | |
|---|---|
| Current value Iout at position A on first conductive path | $Iout < It2$ |
| Voltage value Vout1 at position B on first conductive path | $Vt1 < Vout1 < Vt2$ |
| Voltage value Vout2 at position C on second conductive path | $Vt3 < Vout2 < Vt4$ |

Operation in normal state

| | |
|---|---|
| First switch unit | ON |
| Second switch unit | OFF |

FIG. 3

First abnormal state

| | |
|---|---|
| Current value Iout at position A on first conductive path | $Iout \geq It2$ |

Operation in first abnormal state

| | |
|---|---|
| First switch unit | OFF |
| Second switch unit | OFF |

FIG. 4

Second abnormal state

| Current value Iout at position A on first conductive path | Iout < It2 |
|---|---|
| Voltage value Vout1 at position B on first conductive path | Vt1 ≧ Vout1 |

Operation in second abnormal state

| First switch unit | OFF |
|---|---|
| Second switch unit | ON |

FIG. 5

Third abnormal state

| Current value Iout at position A on first conductive path | Iout < It2 |
|---|---|
| Voltage value Vout1 at position B on first conductive path | Vt1 < Vout1 < Vt2 |
| Voltage value Vout2 at position C on second conductive path | Vout2 ≧ Vt4 |

Operation in third abnormal state

| First switch unit | OFF |
|---|---|
| Second switch unit | ON |

FIG. 6

Fourth abnormal state

| Current value Iout at position A on first conductive path | Iout < It2 |
|---|---|
| Voltage value Vout1 at position B on first conductive path | Vt1 < Vout1 < Vt2 |
| Voltage value Vout2 at position C on second conductive path | Vout2 ≦ Vt3 |

Operation in fourth abnormal state

| First switch unit | ON |
|---|---|
| Second switch unit | OFF |

FIG. 7

POWER SUPPLY DEVICE

CROSS-REFERENCE TO RELATED APPLICATIONS

This application is the U.S. national stage of PCT/JP2017/018162, filed May 15, 2017, which claims priority of Japanese Patent Application No. JP 2016-108349 filed May 31, 2016.

TECHNICAL FIELD

The present disclosure relates to a power supply device that is provided between a plurality of power supply units.

BACKGROUND

Technology disclosed in JP 07-55025B, for example, is proposed as an example of a power supply device that supplies power from a plurality of power supplies to a load. The power supply device disclosed in JP 07-55025B is provided with a plurality of DC power supplies, and a DC power supply synthetic circuit is provided between each DC power supply and a shared device. Furthermore, in the DC power supply synthetic circuits, paths from the DC power supplies are respectively provided with power MOSFETs so that a reverse current in each path can be blocked.

However, in each DC power supply synthetic circuit disclosed in JP 07-55025B, if a short circuit failure occurs in the MOSFET that is on the path from either one of the DC power supplies, a reverse current that is caused by power from the other power supply cannot be blocked, which is a problem. For example, in a case where a short circuit failure occurs in a MOSFET that is provided on a path for a reserve DC power supply, even if a MOSFET on a working DC power supply is turned OFF, the parasitic diode of this MOSFET and the MOSFET in which the short circuit failure occurred hold an electrically connected state. Therefore, a current flowing into the reserve DC power supply from the working DC power supply cannot be blocked, and there is a concern that overcharge will occur.

The present disclosure has been made in view of the above-described situation, and aims to realize a power supply device that can, even if an abnormality occurs in either one of the power supply units, block a current from flowing into the path for the power supply unit from the other power supply unit.

SUMMARY

A power supply device according to the present disclosure includes a first conductive path that is a path for power between an on-board first power supply unit and a load; a second conductive path that is connected to the first conductive path and to an on-board second power supply unit that is chargeable and dischargeable; a first switch unit that is provided on the first conductive path between a connection part, at which the first conductive path is connected to the second conductive path, and the first power supply unit, and switches to an electrically disconnected state, in which the first switch unit blocks a current from flowing in either direction, and to an electrically connected state, in which the first switch unit allows a current to flow therethrough. A second switch unit that is provided on the second conductive path between the connection part and the second power supply unit, and switches to an electrically disconnected state, in which the second switch unit blocks a current from flowing in either direction, and to an electrically connected state, in which the second switch unit allows a current to flow therethrough; and a control unit that controls respective switching operations of the first switch unit and the second switch unit. A first voltage detection unit detects a voltage value at a position on the first conductive path between the first power supply unit and the first switch unit. A second voltage detection unit detects a voltage value at a position on the second conductive path between the second switch unit and the second power supply unit; and a current detection unit detects a current value at a position on the first conductive path between the connection part and the load, wherein, in a normal state, the control unit performs control to bring the first switch unit into an ON state and the second switch unit into an OFF state, and control to bring the first switch unit into an ON state and the second switch unit into an ON state, the normal state being a state in which the current value of a current flowing through the first conductive path, detected by the current detection unit, is smaller than a predetermined current threshold value, the voltage value detected by the first voltage detection unit is within a normal range, and the voltage value detected by the second voltage detection unit is in a normal range. In a first abnormal state, the control unit brings the first switch unit into an OFF state and the second switch unit into an OFF state, the first abnormal state being a state in which the current value of a current flowing through the first conductive path, detected by the current detection unit, is greater than the current threshold value. In a second abnormal state, the control unit brings the first switch unit into an OFF state and the second switch unit into an ON state, the second abnormal state being a state in which the current value of a current flowing through the first conductive path, detected by the current detection unit, is smaller than the current threshold value, and the voltage value detected by the first voltage detection unit is no greater than a first lower limit voltage threshold value in a third abnormal state, the control unit brings the first switch unit into an OFF state and the second switch unit into an ON state, the third abnormal state being a state in which the current value of a current flowing through the first conductive path, detected by the current detection unit, is smaller than the current threshold value, the voltage value detected by the second voltage detection unit is no less than a predetermined overvoltage threshold value, and in a fourth abnormal state, the control unit brings the first switch unit into an ON state and the second switch unit into an OFF state, the fourth abnormal state being a state in which the current value of a current flowing through the first conductive path, detected by the current detection unit, is smaller than the current threshold value, the voltage value detected by the first voltage detection unit is within the normal range, and the voltage value detected by the second voltage detection unit is no greater than a predetermined second lower limit voltage value.

With the above-described power supply device, even if an abnormality occurs in either one of the power supply units, it is possible to block a current from flowing into the path from the other power supply unit. For example, even if a short circuit failure occurs in the second switch unit, it is possible to prevent a current from flowing from the first power supply unit to the second power supply unit side by causing the first switch unit to perform an OFF operation.

DETAILED DESCRIPTION OF PREFERRED EMBODIMENTS

The following describes preferable examples of the present disclosure.

The first conductive path may be electrically connected to a fuse unit that blocks a current from flowing between the first power supply unit and the first switch unit upon the first conductive path coming into a predetermined overcurrent state.

In the power supply device with such a configuration, if an overcurrent occurs in the first conductive path, the fuse unit can swiftly block a current from flowing through this path, and achieve protection.

The power supply device may further include a first voltage detection unit that detects a voltage value across a conductive path between the fuse unit and the first switch unit. The control unit may be configured to bring the first switch unit into an electrically disconnected state and the second switch unit into an electrically connected state if a voltage value detected by the first voltage detection unit is no greater than a predetermined low voltage threshold value.

In the power supply device with such a configuration, in a case where a low potential state occurs at a position between the fuse unit and the first switch unit due to a ground fault or the like, for example, even if an overcurrent flows to this position (the low potential position between the fuse unit and the first switch unit) from the first power supply unit, the fuse unit swiftly blocks this path and achieves protection. Also, since it is possible to bring the first switch unit into an electrically disconnected state and the second switch unit in an electrically connected state in a situation where power supply from the first power supply unit is blocked in such a way, it is possible to prevent a current from flowing to the low potential position (the low potential position between the fuse unit and the first switch unit) from the second power supply unit side, while maintaining power supply from the second power supply unit to the first conductive path.

The power supply device may further include a second voltage detection unit that detects a voltage value across the second conductive path. The control unit may be configured to bring the first switch unit into an electrically disconnected state if a voltage value detected by the second voltage detection unit is no less than a predetermined overvoltage threshold value.

In the power supply device with such a configuration, even if a short circuit failure occurs in the second switch unit and a charging current flows into the second power supply unit from the first power supply unit, for example, it is possible to bring the first switch unit into an electrically disconnected state when the voltage value across the second conductive path has increased to a certain level, in order to block a current from flowing into the second power supply unit from the first power supply unit. With such functions, it is possible to enhance the overcharge prevention effect of the second power supply unit.

The second voltage detection unit may be configured to detect a voltage value at a position on the second conductive path between the second switch unit and the second power supply unit. The control unit may be configured to hold the second switch unit in an electrically disconnected state if a voltage value detected by the second voltage detection unit is no greater than a predetermined abnormality threshold value.

In the power supply device with such a configuration, for example, if a voltage value at a position between the second switch unit and the second power supply unit has dropped to be no greater than the predetermined abnormality threshold value due to a ground fault or the like, it is possible to hold the second switch unit in an electrically disconnected state, and it is possible to prevent a current from flowing to the predetermined position from the first conductive path side. Therefore, even if the first switch unit is brought into an electrically connected state in such a situation, a current is prevented from flowing into the second power supply unit side, and it is possible to continue power supply.

The power supply device according to the present disclosure may further include a charging/discharging unit that performs a discharging operation to convert an input voltage from the second power supply unit side, and to output the converted input voltage to the first conductive path side according to a switching operation of a switching device, and performs a charging operation to supply a charging current that is based on power from the first conductive path to the second power supply unit according to an operation of a switching device. Also, at least a part of the second switch unit may be configured as a switching device of the charging/discharging unit.

With this configuration, the charging/discharging unit that can perform voltage conversion is used to realize discharging from the second power supply unit and charging of the second power supply unit, and a switching device that is a part of the charging/discharging unit is also used as the second switch unit, so that the number of parts can be reduced and downsizing can be realized, for example.

First Embodiment

The following describes a first embodiment, which is a specific example of the present disclosure.

Configuration of Power Supply Device

First, a power supply device 30 and configurations related thereto will be described.

Figure 1:
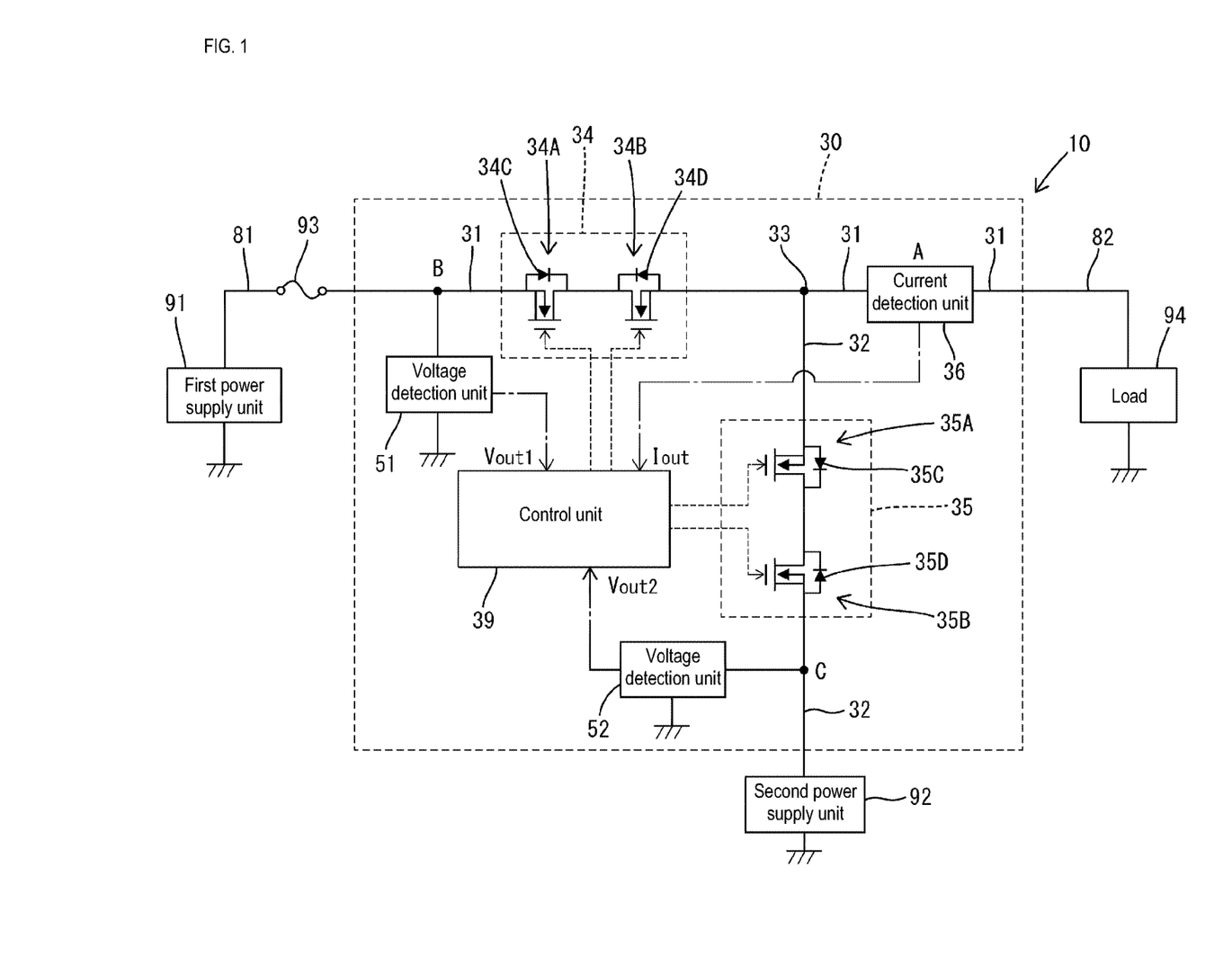
FIG. 1 is a circuit diagram schematically showing an on-board system that is provided with a power supply device according to a first embodiment.

An on-board system 10 shown in FIG. 1 is configured as an on-board power supply system, and includes, for example, a first power supply unit 91, a second power supply unit 92, a fuse unit 93, a load 94, and the power supply device 30. The on-board system 10 is configured such that the first power supply unit 91 can supply power to the load 94, and such that the first power supply unit 91 can also supply power to the second power supply unit 92. That is, the first power supply unit 91 can supply both a load current and a charging current. Furthermore, the on-board system 10 is configured such that the second power supply unit 92 can supply power to the load 94 during a predetermined period (e.g. when a failure occurs in the first power supply unit 91).

The first power supply unit 91 is a DC power supply that generates a DC voltage, and a well-known electricity storage means such as a lead battery is employed. The first power supply unit 91 is provided with a high potential-side terminal and a low potential-side terminal. The high potential-side terminal is electrically connected to a first conductive path 31, and the low potential-side terminal is electrically connected to ground, for example. The first power supply unit 91 is configured to apply a predetermined output voltage to the first conductive path 31. For example, the output voltage when the first power supply unit 91 is in a fully-charged state is approximately within the range of 12 V to 14 V. Note that a generator (not shown) is electrically connected to the first conductive path 31, and the first power supply unit 91 can be charged using power generated by the generator.

The fuse unit 93 is configured as a well-known on-board fuse part, and is provided on a wire 81, which is a conductive path that is electrically connected to the first power supply unit 91. One end of the fuse unit 93 is electrically connected to the first power supply unit 91 via the wire 81, and the other end is electrically connected to a first switch unit 34 via the first conductive path 31. The fuse unit 93 in an unblown state constitutes a portion of the path (conductive path) between the first power supply unit 91 and the first switch unit 34, and blows when a current that has a value greater than a predetermined current value (the blowing current value of the fuse unit 93) flows therethrough. When the fuse unit 93 is in a blown state, the first power supply unit 91 and the first switch unit 34 are in an electrically disconnected state.

The load 94 is a well-known on-board electronic part. For example, a navigation system, an audio system, an air conditioner, a meter, or a transmission may be adopted. The load 94 is electrically connected to a wire 82, and is electrically connected to the first conductive path 31 via the wire 82.

The second power supply unit 92 is a DC power supply that outputs a DC voltage, and includes an electric double-layer capacitor, for example. One terminal of the second power supply unit 92 (the high potential-side terminal) is electrically connected to a second conductive path 32, and a predetermined output voltage is applied thereto. The other terminal (the low potential-side terminal) is electrically connected to ground, and is held at a predetermined potential (e.g. 0 V). The second power supply unit 92 is charged by being supplied with a charging current from the first power supply unit 91 via the first conductive path 31 and the second conductive path 32 when the first switch unit 34 and a second switch unit 35 are in an ON state (an electrically connected state).

The second power supply unit 92 can function as a backup power supply for the first power supply unit 91. For example, even in a situation where the first switch unit 34 is in an OFF state and no power is supplied from the first power supply unit 91 to the load 94, if the second switch unit 35 is in an ON state, it is possible to supply power from the second power supply unit 92 to the load 94, and it is possible to supply a load current to the load 94. Note that the output voltage of the second power supply unit 92 in a fully-charged state is smaller than the output voltage of the first power supply unit 91 in a fully-charged state, and thus the second power supply unit 92 can be downsized.

The power supply device 30 includes the first conductive path 31, the second conductive path 32, the first switch unit 34, the second switch unit 35, a current detection unit 36, a voltage detection unit 51, a voltage detection unit 52, and a control unit 39.

The first conductive path 31 is a conductive path that is a power path between the first power supply unit 91 and the load 94, and is electrically connected to the first power supply unit 91 and the load 94.

The first switch unit 34 is provided on the first conductive path 31 between a connection part 33 and the first power supply unit 91, and has the function of switching to an electrically disconnected state, where the first switch unit 34 blocks a current from flowing between the first power supply unit 91 and the connection part 33 in either direction, and to an electrically connected state, where the first switch unit 34 allows a current to flow (the first power supply unit 91 and the connection part 33 are electrically connected). The connection part 33 is a part at which the first conductive path 31 and the second conductive path 32 are connected to each other. Specifically, the first switch unit 34 is provided on the first conductive path 31 between the connection part 33 and the fuse unit 93.

The first switch unit 34 includes two semiconductor switching devices, and specifically includes a first switching device 34A and a second switching device 34B. The first switching device 34A and the second switching device 34B are each configured as a MOSFET, and are positioned in mutually opposite orientations. Specifically, the source of the first switching device 34A is electrically connected to the first power supply unit 91 via the fuse unit 93 and the first conductive path 31, and the drain of the same is connected to the drain of the second switching device 34B. The source of the second switching device 34B is electrically connected to the load 94 via the second conductive path 32, and the drain of the same is connected to the drain of the first switching device 34A. In the first switch unit 34, a parasitic diode 34C of the first switching device 34A and a parasitic diode 34D of the second switching device 34B are positioned in mutually opposite orientations, so that the parasitic diode 34C is configured to not allow a current to flow from the connection part 33 side to the first power supply unit 91 side, and the parasitic diode 34D is configured to not allow a current to flow from the first power supply unit 91 side to the connection part 33 side. Therefore, when the first switching device 34A and the second switching device 34B are in an OFF state, a current does not flow through the parasitic diodes 34C and 34D, and thus a current is blocked from flowing in either direction.

The first switching device 34A and the second switching device 34B included in the first switch unit 34 are controlled by the control unit 39 described below, so as to perform an ON operation and an OFF operation. Specifically, the control unit 39 is configured to input an ON signal or an OFF signal to the respective gates of the first switching device 34A and the second switching device 34B. When an ON signal is input from the control unit 39 to the gates of the first switching device 34A and the second switching device 34B, both the first switching device 34A and the second switching device 34B are in an ON state, and the first conductive path 31 is in an electrically connected state. Similarly, when an OFF signal is input from the control unit 39 to the gates of the first switching device 34A and the second switching device 34B, both the first switching device 34A and the second switching device 34B are in an OFF state, and the first conductive path 31 is in an electrically disconnected state.

Upon the first conductive path 31 being switched to an electrically connected state due to an ON operation of the first switch unit 34, the first power supply unit 91 can supply power to the load 94 via the first conductive path 31, and the first conductive path 31 functions as a current path that is used when a load current is fed from the first power supply unit 91 to the load 94. Similarly, upon the first conductive path 31 being switched to an electrically disconnected state due to an OFF operation of the first switch unit 34, power supply from the first power supply unit 91 to the load 94 stops.

The second conductive path 32 is electrically connected to the first conductive path 31 and the second power supply unit 92. The second conductive path 32 functions as a current path when a charging current is fed from the first power supply unit 91 to the second power supply unit 92, and also functions as a current path when a discharge current is fed from the second power supply unit 92 to the load 94.

The second switch unit 35 is provided on the second conductive path 32 between the connection part 33 and the second power supply unit 92, and has the function of switching to an electrically disconnected state, where the second switch unit 35 blocks a current from flowing between the connection part 33 and the second power supply unit 92 in either direction, and to an electrically connected state, where the second switch unit 35 allows a current to flow (the connection part 33 and the second power supply unit 92 are electrically connected).

The second switch unit 35 includes two semiconductor switching devices, and specifically includes a third switching device 35A and a fourth switching device 35B. The third switching device 35A and the fourth switching device 35B are each configured as a MOSFET, and are positioned in mutually opposite orientations. Specifically, the source of the third switching device 35A is electrically connected to the first conductive path 31, and the drain of the same is connected to the drain of the fourth switching device 35B. The source of the fourth switching device 35B is electrically connected to the second power supply unit 92, and the drain of the same is connected to the drain of the third switching device 35A. In the second switch unit 35, a parasitic diode 35C of the third switching device 35A and a parasitic diode 35D of the fourth switching device 35B are positioned in mutually opposite orientations, so that the parasitic diode 35C is configured to not allow a current to flow from the second power supply unit 92 side to the connection part 33 side, and the parasitic diode 35D is configured to not allow a current to flow from the connection part 33 side to the second power supply unit 92 side. Therefore, when the third switching device 35A and the fourth switching device 35B are in an OFF state, a current does not flow through the parasitic diodes 35C and 35D, and thus a current is blocked from flowing in either direction.

The third switching device 35A and the fourth switching device 35B included in the second switch unit 35 are controlled by the control unit 39 described below, so as to perform an ON operation and an OFF operation. Specifically, the control unit 39 is configured to input an ON signal or an OFF signal to the respective gates of the third switching device 35A and the fourth switching device 35B. When an ON signal is input from the control unit 39 to the gates of the third switching device 35A and the fourth switching device 35B, both the third switching device 35A and the fourth switching device 35B enter an ON state, and the second conductive path 32 is in an electrically connected state. Similarly, when an OFF signal is input from the control unit 39 to the gates of the third switching device 35A and the fourth switching device 35B, both the third switching device 35A and the fourth switching device 35B enter an OFF state, and the second conductive path 32 enters an electrically disconnected state.

Upon the second conductive path 32 being switched to an electrically connected state due to an ON operation of the second switch unit 35, the second power supply unit 92 can supply power to the load 94 via the second conductive path 32, and the second conductive path 32 functions as a current path that is used when a load current is fed from the second power supply unit 92 to the load 94. Similarly, upon the second conductive path 32 being switched to an electrically disconnected state due to an OFF operation of the second switch unit 35, power supply from the second power supply unit 92 to the load 94 stops.

The current detection unit 36 is provided at a predetermined position on the first conductive path 31 (specifically, a position between the connection part 33 and the load 94). The current detection unit 36 is configured as a well-known current detection circuit, and is configured to output a value that can specify a current value Tout of a current flowing through the first conductive path 31 (specifically, a voltage value corresponding to the magnitude of a current flowing through the first conductive path 31). For example, the current detection unit 36 is provided with a resistor and a differential amplifier that are provided on the first conductive path 31, and the voltage across the resistor is input to the differential amplifier, and the amount of a voltage drop that has occurred in the resistor due to a current flowing through the first conductive path 31 is amplified by the differential amplifier and is output as a detection value. The detection value (the current value Tout) output from the current detection unit 36 is input to the control unit 39.

The voltage detection unit 51 is an example of the first voltage detection unit, and is configured to output a value that can specify a voltage value Vout1 at a predetermined position on the first conductive path 31 (specifically, a position between the first switch unit 34 and the fuse unit 93) (specifically, a value that can specify the voltage value Vout1 corresponds to the voltage at the predetermined position). For example, the voltage detection unit 51 outputs the voltage value Vout1 itself at the position between the first switch unit 34 and the fuse unit 93, or a value obtained by dividing the voltage value Vout1 using a voltage divider circuit, as a detection value (a value that can specify the voltage value Vout1).

The voltage detection unit 52 is an example of the second voltage detection unit, and is configured to output a value that can specify a voltage value Vout2 at a predetermined position on the second conductive path 32 (specifically, a position between the second switch unit 35 and the second power supply unit 92) (specifically, a voltage that can specify the voltage value Vout2 corresponds to the voltage at the predetermined position). For example, the voltage detection unit 52 outputs the voltage value Vout2 itself at the position between the second switch unit 35 and the second power supply unit 92, or a value obtained by dividing the voltage value Vout2 using a voltage divider circuit, as a detection value (a value that can specify the voltage value Vout2).

The control unit 39 is configured as a control circuit that includes a microcomputer, for example, and includes a CPU, a storage unit, and so on. The control unit 39 has the function of controlling the respective switching operations of the first switch unit 34 and the second switch unit 35.

Basic Operations of Power Supply Device

Next, operations of the power supply device 30 will be described.

The power supply device 30 is configured to be able to use the first power supply unit 91 as a primary power supply in a normal case. The power supply device 30 is also configured to be able to use the second power supply unit 92 as a backup for the first power supply unit 91 in an abnormal case where the first power supply unit 91 is not available. The following specifically describes operations of the power supply device 30.

In this configuration, when an ignition switch (not shown) that is provided in a vehicle on which the power supply device 30 is mounted is in an OFF state, an IG OFF signal, which indicates that the ignition switch is in an OFF state, is input from an external ECU to the control unit 39, and when the ignition switch is in an ON state, an IG ON signal, which indicates that the ignition switch is in an ON state, is input from the external ECU to the control unit 39.

When the vehicle stops operating (when the ignition switch performs an OFF operation), for example, an OFF signal is input to the respective gates of the first switch unit 34 and the second switch unit 35, and the first switch unit 34 and the second switch unit 35 are held in an OFF state.

Upon the state of the ignition switch changing from an OFF state to an ON state, the control unit 39 outputs an ON signal to the respective gates of the first switching device 34A and the second switching device 34B included in the first switch unit 34. In response to such an output ON signal, the states of both the first switching device 34A and the second switching device 34B of the first switch unit 34 switch from an OFF state to the ON state. Upon the first switch unit 34 switching to an ON state, a current is supplied from the first power supply unit 91 to the load 94.

After switching the first switch unit 34 to an ON state in this way, the control unit 39 determines the operational states of the first switch unit 34 and the second switch unit 35 according to the results of detection performed by the current detection unit 36, the voltage detection unit 51, and the voltage detection unit 52.

Operations in Normal State

First, operations in a normal state will be described. A normal state mentioned here means a state where the detection value detected by the current detection unit 36, the detection value detected by the voltage detection unit 51, and the detection value detected by the voltage detection unit 52 are all within a normal range during a period in which the ignition switch is in an ON state. Specifically, a normal state means that, in a period for which the ignition switch is in an ON state, the current value Tout at a position A on the first conductive path 31, specified by the detection value detected by the current detection unit 36, is within a normal current range that is below a predetermined upper limit current value It2 (a predetermined current threshold value), the voltage value Vout1 at a position B specified by the detection value detected by the voltage detection unit 51 is within a first normal voltage range that is above a first lower limit voltage value Vt1 (a predetermined low voltage threshold value) and below a first upper limit voltage value Vt2, and the voltage value Vout2 at a position C specified by the detection value detected by the voltage detection unit 52 is within a second normal voltage range that is above a second lower limit voltage value Vt3 (a predetermined abnormality threshold value) and below a second upper limit voltage value Vt4 (a predetermined overvoltage threshold value). In other words, a normal state is a state that satisfies relationships Iout<It2, Vt1<Vout1<Vt2, and Vt3<Vout1<Vt4 as shown in FIG. 2.

Figure 2:
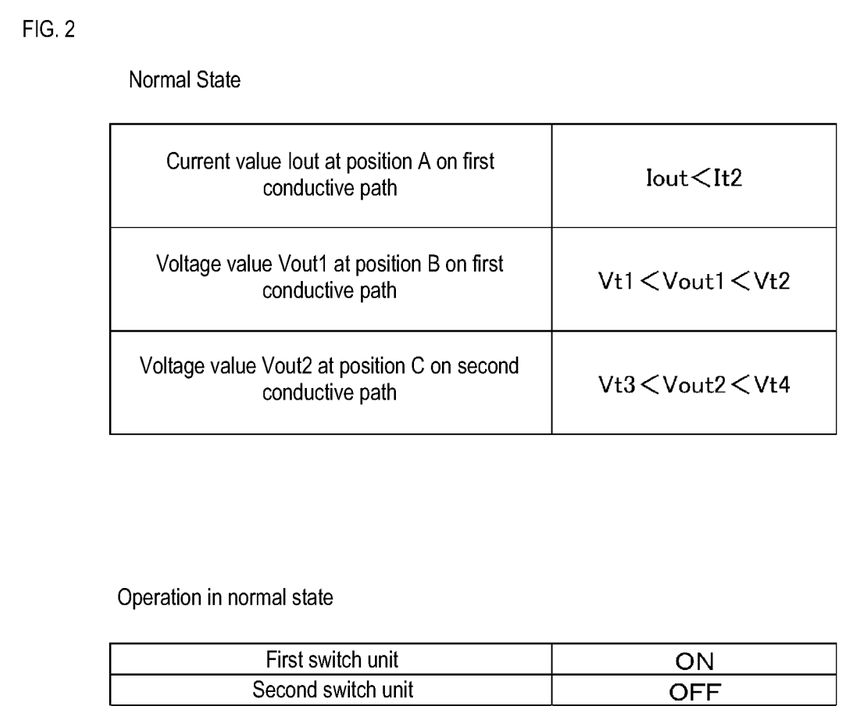
FIG. 2 is a diagram schematically illustrating a normal state of the power supply device in FIG. 1 and operations thereof in the state.

In such a normal state, as shown in FIG. 2, the control unit 39 causes the first switch unit 34 to perform an ON operation (i.e. causes the first switching device 34A and the second switching device 34B to perform an ON operation), and causes the second switch unit 35 to perform an OFF operation (i.e. causes the third switching device 35A and the fourth switching device 35B to perform an OFF operation). Through such operations, it is possible to supply power from the first power supply unit 91 to the load 94.

However, even in a normal state, if a predetermined charging condition is satisfied (e.g. during a predetermined charging period such as a period in which a voltage value detected by the voltage detection unit 52 is no greater than a predetermined charging determination threshold value), the control unit 39 can cause the second switch unit 35 to perform an ON operation (i.e. cause the third switching device 35A and the fourth switching device 35B to perform an ON operation) to charge the second power supply unit 92 using power from the first power supply unit 91. Note that when causing the second switch unit 35 to perform an ON operation to charge the second power supply unit 92, the control unit 39 causes the second switch unit 35 to perform an OFF operation upon the detection value detected by the voltage detection unit 52 reaching a certain value (i.e. upon the voltage value Vout2 reaching a threshold value that indicates a fully-charged state), for example. When the control unit 39 causes the second switch unit 35 to perform an OFF operation in this way, power supply from the first conductive path 31 side to the second power supply unit 92 side and power supply from the second power supply unit 92 side to the first conductive path 31 side are both blocked.

Operations in First Abnormal State

Figure 3:
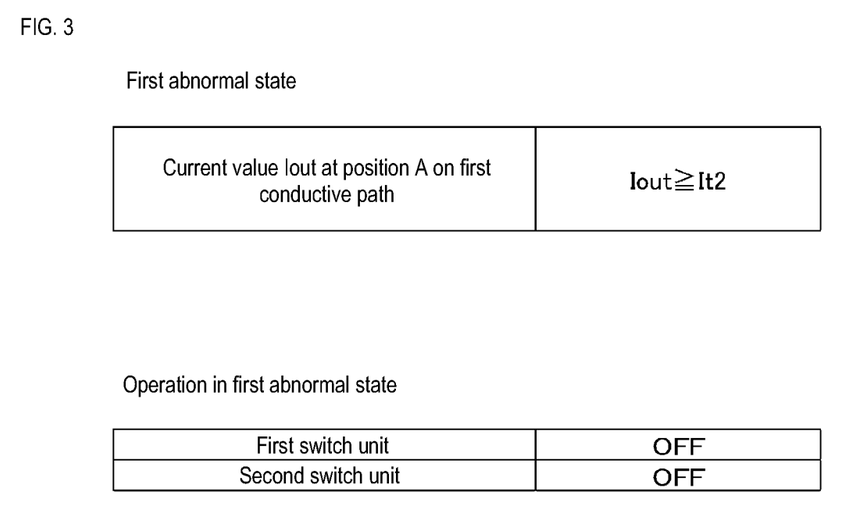
FIG. 3 is a diagram schematically illustrating a first abnormal state of the power supply device in FIG. 1 and operations thereof in the state.

Next, the following describes operations that are performed when an overcurrent occurs in the first conductive path 31 (a first abnormal state). For example, when an overcurrent occurs in the first conductive path 31, such as when a ground fault occurs in the wire 82, the current value Tout, which is specified by a detection value from the current detection unit 36, increases. The control unit 39 monitors detection values output from the current detection unit 36. Upon the current value Tout of the first conductive path 31 reaching a value no less than the upper limit current value It2 (the current threshold value), the control unit 39 causes both the first switch unit 34 and the second switch unit 35 to perform an OFF operation, as shown in FIG. 3. As a result, no current flows from the first power supply unit 91 to the load 94, and no current flows from the second power supply unit 92 to the load 94 either. Note that, if an overcurrent flows from the first power supply unit 91 to a ground fault position on the wire 82, the fuse unit 93 will blow, and thus power supply from the first power supply unit 91 will be blocked by this time at the latest.

Operations in Second Abnormal State

Figure 4:
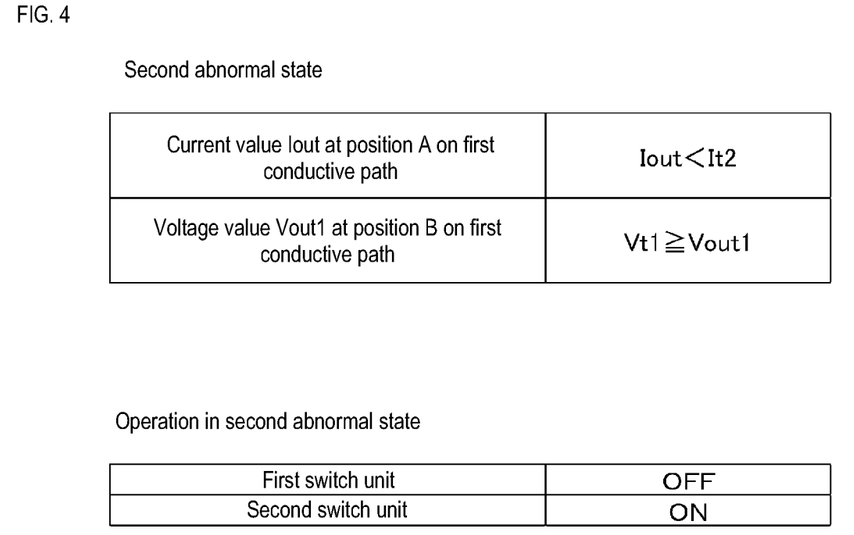
FIG. 4 is a diagram schematically illustrating a second abnormal state of the power supply device in FIG. 1 and operations thereof in the state.

Next, the following describes operations that are performed by the power supply device 30 when a ground fault or the like occurs at a position between the fuse unit 93 and the first switch unit 34 and a large potential drop occurs at this position (a second abnormal state). If a ground fault occurs at a position between the fuse unit 93 and the first switch unit 34, an excessive current flows from the first power supply unit 91 to the position where the ground fault occurred. Then, upon the magnitude of a current flowing through the fuse unit 93 reaching the predetermined current value (the blowing current value), the fuse unit 93 blows. Note that a state where a current that is large enough to blow the fuse unit 93 flows is "the predetermined overcurrent state", and when the first conductive path 31 enters "the predetermined overcurrent state", a current is blocked from flowing between the first power supply unit 91 and the first switch unit 34, due to the fuse unit 93 having been blown.

The control unit 39 monitors detection values output from the voltage detection unit 51. If the voltage value Vout1 at the position B, detected by the voltage detection unit 51 (the first voltage detection unit), is no greater than the first lower limit voltage value Vt1 (the first voltage threshold value), the control unit 39 brings the first switch unit 34 into an OFF state, which is an electrically disconnected state. Furthermore, if the state is not the first abnormal state (i.e. if the current value Iout of the first conductive path 31 is smaller than the upper limit current value It2 (the current threshold value)), the control unit 39 brings the second switch unit 35 into an ON state, which is an electrically connected state. Through such operations, the second power supply unit 92 and the first conductive path 31 become electrically connected. Thus, power can be supplied from the second power supply unit 92 to the load 94, and the second power supply unit 92 can operate as a backup power supply. Also, since the first switch unit 34 is in an OFF state while the second power supply unit 92 operates as a backup power supply, no current flows to the position where the ground fault occurred, from the second power supply unit 92.

Operations in Third Abnormal State

Figure 5:
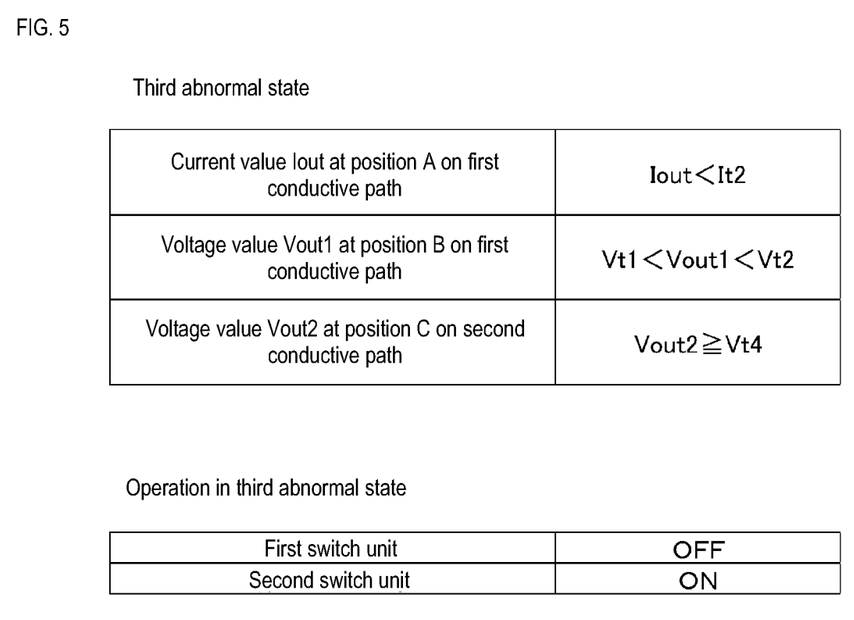
FIG. 5 is a diagram schematically illustrating a third abnormal state of the power supply device in FIG. 1 and operations thereof in the state.

Next, the following describes operations that are performed by the power supply device 30 in a short circuit state (a third abnormal state) where a short circuit failure has occurred in the fourth switching device 35B, and the fourth switching device 35B is held in an electrically connected state even though an OFF instruction has been given to the fourth switching device 35B.

For example, in a case where the power supply device 30 is in the above-described normal state, if a short circuit failure occurs in the fourth switching device 35B when the control unit 39 is in the middle of causing the first switch unit 34 to perform an ON operation and the second switch unit 35 to perform an OFF operation, the first power supply unit 91 and the second power supply unit 92 enter an electrically connected state. At this time, if the output voltage from the first power supply unit 91 is larger than the output voltage from the second power supply unit 92, a charging current flows into the second power supply unit 92 from the first power supply unit 91.

Meanwhile, the control unit 39 monitors detection values output from the voltage detection unit 52, and if the voltage value Vout2 at the position C, detected by the voltage detection unit 52 (the second voltage detection unit), is no less than the second upper limit voltage value Vt4 (the predetermined overvoltage threshold value), the control unit 39 brings the first switch unit 34 into an OFF state, which is an electrically disconnected state, and furthermore, if the state is not the first abnormal state (i.e. if the current value Iout of the first conductive path 31 is smaller than the upper limit current value It2 (the current threshold value)), the control unit 39 brings the second switch unit 35 into an ON state, which is an electrically connected state. Through such operations, it is possible to prevent the second power supply unit 92 from being overcharged, and allow the load 94 to keep operating when a short circuit failure occurs in the fourth switching device 35B. Note that the second upper limit voltage value Vt4 may be the same as or greater than the above-described threshold value that indicates a fully-charged state.

Operations in Fourth Abnormal State

Figure 6:
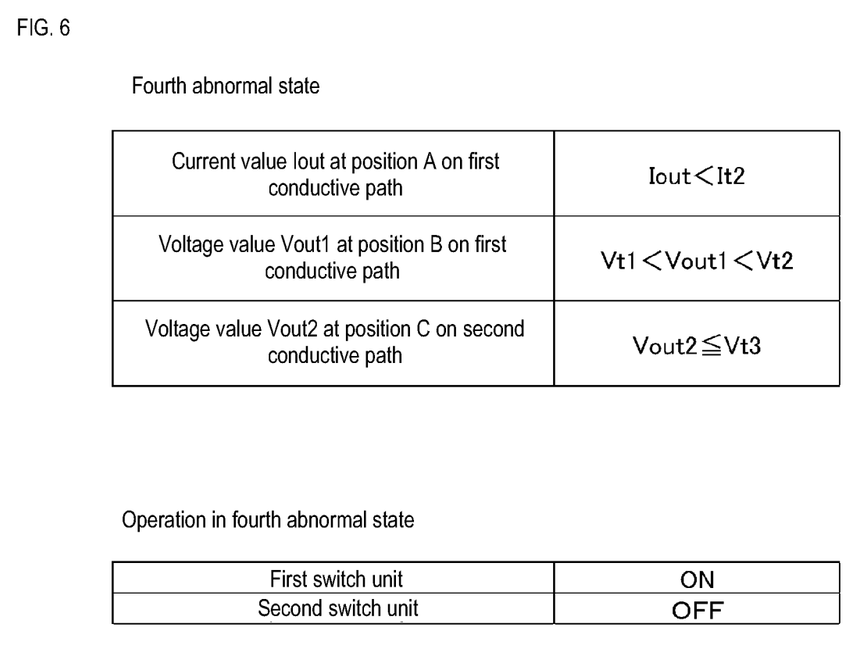
FIG. 6 is a diagram schematically illustrating a fourth abnormal state of the power supply device in FIG. 1 and operations thereof in the state.

Next, the following describes operations that are performed by the power supply device 30 when a short circuit failure or the like occurs in the second power supply unit 92 and a large potential drop occurs at a position between the fourth switching device 35B and the second power supply unit 92 (a fourth abnormal state).

If the voltage value Vout2 at the position C, detected by the voltage detection unit 52 (the second voltage detection unit), is no greater than the second lower limit voltage value Vt3 (the predetermined abnormality threshold value), the control unit 39 brings the second switch unit 35 into an OFF state, which is an electrically disconnected state. Furthermore, if the state is not the first abnormal state or the second abnormal state (specifically, if Iout<It2 and Vt1<Vout1<Vt2 are satisfied), the control unit 39 brings the first switch unit 34 into an ON state, which is an electrically connected state. Thus, it is possible to prevent a current from flowing to a second power supply unit 92-side low potential position from the first power supply unit 91, while enabling the load 94 to keep operating. In a case where the power supply device 30 is in a normal state, and the first switch unit 34 is in an ON state and the second switch unit 35 is in an OFF state, if the state of the power supply device 30 changes to such a fourth abnormal state, each switch unit is held in the same state as when the power supply device 30 is in a normal state. Also, when the power supply device 30 is in a normal state, if the voltage value Vout2 at the position C changes to be no greater than the second lower limit voltage value Vt3 (the predetermined abnormality threshold value), the abnormal state may be memorized, or notified to an external device (e.g. an external ECU), for example.

As described above, with the power supply device 30, even if an abnormality occurs in either one of the power supply units, it is possible to block a current from flowing into the path from the other power supply unit. For example, even if a short circuit failure occurs in the second switch unit 35 as described above, it is possible to prevent a current from flowing from the first power supply unit 91 to the second power supply unit 92 side by causing the first switch unit 34 to perform an OFF operation.

The first conductive path 31 is electrically connected to the fuse unit 93 that blocks a current from flowing between the first power supply unit 91 and the first switch unit 34 when the first conductive path 31 enters a predetermined overcurrent state. In the power supply device 30 with such a configuration, if an overcurrent occurs in the first conductive path 31, the fuse unit 93 can swiftly block a current from flowing through this path, and achieve protection.

The power supply device 30 is provided with the voltage detection unit 51 (the first voltage detection unit) that detects a voltage value across the conductive path between the fuse unit 93 and the first switch unit 34. As shown in FIG. 4, the control unit 39 brings the first switch unit 34 into an electrically disconnected state and brings the second switch unit 35 into an electrically connected state if the voltage value Vout1 detected by the voltage detection unit 51 (the first voltage detection unit) is no greater than the first lower limit voltage value Vt1 (the predetermined low voltage threshold value). In the power supply device 30 with such a configuration, in a case where a low potential state occurs at a position between the fuse unit 93 and the first switch unit 34 due to a ground fault or the like, for example, even if an overcurrent flows to this position (the low potential position between the fuse unit 93 and the first switch unit 34) from the first power supply unit 91, the fuse unit 93 swiftly blocks this path and achieves protection. Also, since it is possible to bring the first switch unit 34 into an electrically disconnected state and the second switch unit 35 into an electrically connected state in a situation where power supply from the first power supply unit 91 is blocked in such a way, it is possible to prevent a current from flowing to the low potential position (the low potential position between the fuse unit 93 and the first switch unit 34) from the second power supply unit 92 side, while maintaining power supply from the second power supply unit 92 to the first conductive path 31.

The power supply device 30 is provided with the voltage detection unit 52 (the second voltage detection unit) that detects a voltage value across the second conductive path 32. As shown in FIG. 5, the control unit 39 brings the first switch unit 34 into an electrically disconnected state if the voltage value Vout2 detected by the voltage detection unit 52 (the second voltage detection unit) is no less than the second upper limit voltage value Vt4 (the predetermined overvoltage threshold value). In the power supply device 30 with such a configuration, even if a short circuit failure occurs in the second switch unit 35 and a charging current flows into the second power supply unit 92 from the first power supply unit 91, for example, it is possible to bring the first switch unit 34 into an electrically disconnected state when the voltage value across the second conductive path 32 has increased to a certain level, in order to block a current from flowing into the second power supply unit 92 from the first power supply unit 91. With such functions, it is possible to enhance the overcharge prevention effect of the second power supply unit 92.

The voltage detection unit 52 (the second voltage detection unit) is configured to detect a voltage value at a position between the second switch unit 35 and the second power supply unit 92 on the second conductive path 32. As shown in FIG. 6, the control unit 39 brings the second switch unit 35 into an electrically disconnected state if the voltage value Vout2 detected by the voltage detection unit 52 (the second voltage detection unit) is no greater than the second lower limit voltage value Vt3 (the predetermined abnormality threshold value). In the power supply device 30 with such a configuration, for example, if a voltage value at a position between the second switch unit 35 and the second power supply unit 92 has dropped to be no greater than the second lower limit voltage value Vt3 (the predetermined abnormality threshold value) due to a ground fault or the like, it is possible to hold the second switch unit 35 in an electrically disconnected state, and it is possible to prevent a current from flowing to the predetermined position from the first conductive path 31 side. Therefore, even if the first switch unit 34 is brought into an electrically connected state in such a situation, a current is prevented from flowing to the second power supply unit 92 side. Therefore, it is possible to continuously supply power from the first power supply unit 91 to the load 94 without any problem.

Note that, with the present configuration, when the power supply device 30 is in a normal state, even if a short circuit failure occurs in one of: the first switching device 34A; the second switching device 34B; and the third switching device 35A, power supply from the first power supply unit 91, which is the primary power supply, to the load 94 is maintained to be continuous, there is no immediate impact on operations of the load 94.

Second Embodiment

The following describes a second embodiment, which is a specific example of the present disclosure.

Figure 7:
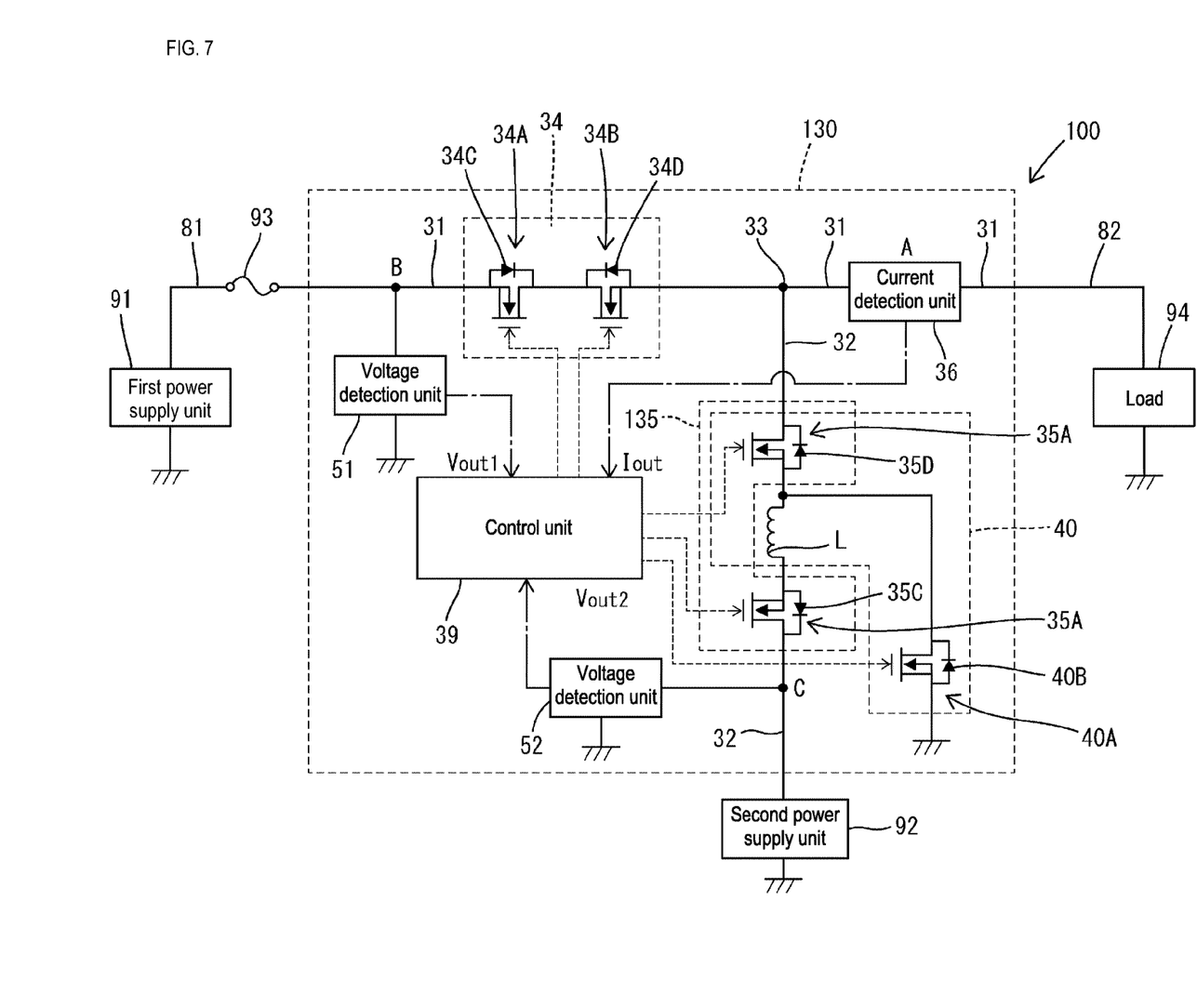
FIG. 7 is a circuit diagram schematically showing an on-board system that is provided with a power supply device according to a second embodiment.

FIG. 7 shows an on-board system 100 in which a power supply device 130 according to the second embodiment is used. Circuit configurations of the on-board system 100 and the power supply device 130 are different from the circuit configurations of the on-board system 10 and the power supply device 30 according to the first embodiment in that the third switching device 35A is provided on the second power supply unit 92 side, and the fourth switching device 35B is provided on the connection part 33 side (i.e. these devices in the first embodiment are replaced with each other), an inductance L is provided between the third switching device 35A and the fourth switching device 35B, and a charging/discharging switching device 40A is provided, but other circuit configurations are the same as those of the first embodiment. Therefore, in the on-board system 100 and the power supply device 130 according to the second embodiment, components that are the same as those in the first embodiment are assigned the same reference numerals, and descriptions thereof are omitted.

The power supply device 130 according to the second embodiment has all of the functions of the power supply device 30 according to the first embodiment, and can perform all kinds of control described for the first embodiment above. Furthermore, in the power supply device 130, a charging/discharging unit 40 can operate as a DC to DC converter.

In a second switch unit 135, the drain of the third switching device 35A is electrically connected to the second power supply unit 92 side, and the drain of the fourth switching device 35B is electrically connected to the first conductive path 31. The inductance L is provided between the third switching device 35A and the fourth switching device 35B. One end of the inductance L is electrically connected to the source of the third switching device 35A, and the other end is electrically connected to the source of the fourth switching device 35B.

The parasitic diode 35C of the third switching device 35A and the parasitic diode 35D of the fourth switching device 35B are positioned in mutually opposite orientations, so that the parasitic diode 35C is configured to not allow a current to flow from the second power supply unit 92 side to the first conductive path 31 side, and the parasitic diode 35D is configured to not allow a current to flow from the first conductive path 31 side to the second power supply unit 92 side. Therefore, when the second switch unit 35 performs an OFF operation, i.e. when both the third switching device 35A and the fourth switching device 35B are in an OFF state, a current does not flow through the parasitic diodes 35C and 35D, and thus a current is blocked from flowing in either direction.

The charging/discharging switching device 40A is configured as a MOSFET. The source thereof is connected to ground, and the drain thereof is electrically connected to the source of the fourth switching device 35B and the other end of the inductance L. A parasitic diode 40B of the switching device 40A is positioned so as not to allow a current to flow from the second conductive path 32 side to the ground side.

The power supply device 130 includes the charging/discharging unit 40, and the charging/discharging unit 40 includes the switching device 40A, the fourth switching device 35B, and the inductance L. In the charging/discharging unit 40, the fourth switching device 35B functions as a high-side switching device, and the switching device 40A functions as a low-side switching device. Thus, the charging/discharging unit 40 operates as a synchronous rectification type DC to DC converter. Then, the control unit 39 sets a dead time and complementarily outputs a PWM signal to the fourth switching device 35B and the switching device 40A of the charging/discharging unit 40. The charging/discharging unit 40 is controlled by the control unit 39 so as to be able to: perform a discharging operation to convert an input voltage from the second power supply unit 92 side and output the converted input voltage to the first conductive path 31 side according to switching operations of the switching devices (the switching device 40A and the fourth switching device 35B); and perform a charging operation to supply the second power supply unit 92 with a charging current that is based on power from the first conductive path 31, according to operations of the switching devices (the switching device 40A and the fourth switching device 35B).

Next, operations of the power supply device 130 will be described.

The power supply device 130 uses the first power supply unit 91 as a primary power supply in a normal case. When the vehicle stops operating (when the ignition switch performs an OFF operation), an OFF signal is input from the control unit 39 to the respective gates of the first switch unit 34 and the second switch unit 135, and the first switch unit 34 and the second switch unit 135 are held in an OFF state. At this time, the switching device 40A is also held in an OFF state. Then, upon the state of the ignition switch changing from an OFF state to an ON state, the control unit 39 outputs an ON signal to the respective gates of the first switching device 34A and the second switching device 34B included in the first switch unit 34. Upon the ON signals being output in such a way, the first switch unit 34 enters an ON state, and a current is supplied from the first power supply unit 91 to the load 94.

After switching the first switch unit 34 to an ON state in this way, the control unit 39 determines the operational states of the first switch unit 34 and the second switch unit 135 according to the results of detection performed by the current detection unit 36, the voltage detection unit 51, and the voltage detection unit 52.

Operations in Normal State

First, operations in a normal state will be described. In a period for which the ignition switch is in an ON state, when the power supply device 130 is in a normal state in which relationships Iout<It2, Vt1<Vout1<Vt2, and Vt3<Vout1<Vt4 are satisfied as shown in FIG. 2, the control unit 39 causes the first switch unit 34 to perform an ON operation (i.e. causes the first switching device 34A and the second switching device 34B to perform an ON operation), and causes the second switch unit 135 to perform an OFF operation (i.e. causes the third switching device 35A and the fourth switching device 35B to perform an OFF operation). Through such operations, it is possible to supply power from the first power supply unit 91 to the load 94.

However, even in a normal state, if a predetermined charging condition is satisfied (e.g. during a predetermined charging period such as a period in which a voltage value detected by the voltage detection unit 52 is no greater than a predetermined charging determination threshold value), the control unit 39 can cause the third switching device 35A to perform an ON operation and cause the charging/discharging unit 40 to operate, to charge the second power supply unit 92 using power from the first power supply unit 91. Note that when charging the second power supply unit 92 by causing the charging/discharging unit 40 to operate in such a way, the control unit 39 complementarily outputs a PWM signal to the fourth switching device 35B and the switching device 40A so that the charging/discharging unit 40 operates as a voltage step-down type DC-DC converter. When causing the charging/discharging unit 40 to operate in such a way to charge the second power supply unit 92, the control unit 39 stops the charging/discharging unit 40 by causing both the fourth switching device 35B and the switching device 40A to perform an OFF operation, and causing the third switching device 35A to perform an OFF operation upon the detection value detected by the voltage detection unit 52 reaching a certain value (i.e. upon the voltage value Vout2 reaching the threshold value that indicates a fully-charged state), for example. At this time, power supply from the first conductive path 31 side to the second power supply unit 92 side and power supply from the second power supply unit 92 side to the first conductive path 31 side are both blocked.

Operations in First Abnormal State

Next, the following describes operations that are performed when an overcurrent occurs in the first conductive path 31 (a first abnormal state). The control unit 39 monitors detection values output from the current detection unit 36. Upon the current value Tout of the first conductive path 31 reaching a value no less than the upper limit current value It2 (the current threshold value), the control unit 39 causes both the first switch unit 34 and the second switch unit 135 to perform an OFF operation, as shown in FIG. 3. The control unit 39 also causes the switching device 40A to perform an OFF operation, to stop the charging/discharging unit 40. As a result, no current flows from the first power supply unit 91 to the load 94, and no current flows from the second power supply unit 92 to the load 94 either.

Operations in Second Abnormal State

The control unit 39 monitors detection values output from the voltage detection unit 51. If the voltage value Vout1 at the position B, detected by the voltage detection unit 51 (the first voltage detection unit), is no greater than the first lower limit voltage value Vt1 (the first voltage threshold value), the control unit 39 brings the first switch unit 34 into an OFF state, which is an electrically disconnected state. Furthermore, if the state is not the first abnormal state (i.e. if the current value Tout of the first conductive path 31 is smaller than the upper limit current value It2 (the current threshold value)), the control unit 39 brings the third switching device 35A into an ON state and causes the charging/discharging unit 40 to operate, so that a power supply state is realized. Note that when supplying power to the first conductive path 31 by causing the charging/discharging unit 40 to operate in such a way, the control unit 39 complementarily outputs a PWM signal to the fourth switching device 35B and the switching device 40A so that the charging/discharging unit 40 operates as a voltage step-up type DC to DC converter to which a voltage applied by the second power supply unit 92 is input as an input voltage and that applies an output voltage to the first conductive path 31 side.

Through such operations, power can be supplied from the second power supply unit 92 to the load 94, and the second power supply unit 92 can operate as a backup power supply. Also, since the first switch unit 34 is in an OFF state while the second power supply unit 92 operates as a backup power supply, even if a ground fault occurs at a position between the fuse unit 93 and the first switch unit 34, no current flows to the position where the ground fault occurred, from the second power supply unit 92.

Operations in Third Abnormal State

The control unit 39 monitors detection values output from the voltage detection unit 52, and if the voltage value Vout2 at the position C, detected by the voltage detection unit 52 (the second voltage detection unit), is no less than the second upper limit voltage value Vt4 (the predetermined overvoltage threshold value), the control unit 39 brings the first switch unit 34 into an OFF state, which is an electrically disconnected state, and furthermore, if the state is not the first abnormal state (i.e. if the current value Tout of the first conductive path 31 is smaller than the upper limit current value It2 (the current threshold value)), the control unit 39 brings the third switching device 35A into an ON state and causes the charging/discharging unit 40 to operate, so that power is supplied to the first conductive path 31 based on power from the second power supply unit 92. That is, the control unit 39 causes the charging/discharging unit 40 to operate as a voltage step-up type DC to DC converter to which a voltage applied by the second power supply unit 92 is input as an input voltage and that applies an output voltage to the first conductive path 31 side. Through such operations, it is possible to prevent the second power supply unit 92 from being overcharged, and allows the load 94 to keep operating when a short circuit failure occurs in the fourth switching device 35B.

Operations in Fourth Abnormal State

If the voltage value Vout2 at the position C, detected by the voltage detection unit 52 (the second voltage detection unit), is no greater than the second lower limit voltage value Vt3 (the predetermined abnormality threshold value), the control unit 39 brings the second switch unit 135 into an OFF state, and also brings the switching device 40A into an OFF state. Furthermore, if the state is not the first abnormal state or the second abnormal state (specifically, if Iout<It2 and Vt1<Vout1<Vt2 are satisfied), the control unit 39 brings the first switch unit 34 into an ON state, which is an electrically connected state. Thus, it is possible to prevent a current from flowing to a second power supply unit 92-side low potential position from the first power supply unit 91, while allowing the load 94 to keep operating. Note that, when the power supply device 130 is in a normal state, if the voltage value Vout2 at the position C changes to be no greater than the second lower limit voltage value Vt3 (the predetermined abnormality threshold value), the abnormal state may be memorized, or an external device (e.g. an external ECU) is notified thereof, for example.

With the present configuration, it is possible to achieve the same effects as the first embodiment.

Also, with the present configuration, the charging/discharging unit 40 that can perform voltage conversion is used to realize discharging from the second power supply unit 92 and charging of the second power supply unit 92, and a switching device (the fourth switching device 35B) that is included in the charging/discharging unit 40 is also used as the second switch unit 35, so that the number of parts can be reduced and downsizing can be realized, for example.

Other Embodiments

The present disclosure is not limited to the embodiments described based on the descriptions above and the drawings, and, for example, the following embodiments are included in the technical scope of the present disclosure.

In the embodiments above, a lead battery is employed as the first power supply unit. However, the present disclosure is not limited to such a configuration. In any of the examples in the present Description, another power supply means (such as another well-known electricity storage means or electricity generation means) may be employed as the first power supply unit, instead of, or together with, the lead battery. The number of power supply means included in the first power supply unit is not limited to one, and the first power supply unit may include a plurality of power supply means.

In the embodiments above, an electric double-layer capacitor is employed as the second power supply unit. However, the present disclosure is not limited to such a configuration. In any of the examples in the present Description, another electricity storage means such as a lithium ion battery, a lithium ion capacitor, a nickel hydrogen rechargeable battery, or the like may be employed as the second power supply unit. The number of electricity storage means included in the second power supply unit is not limited to one, and the second power supply unit may include a plurality of electricity storage means.

In the embodiments above, the switch units, namely the first switch unit and the second switch unit, are configured as two MOSFETs, for example. However, the present disclosure is not limited to such a configuration, as long as it is possible to block a current from flowing in either direction, and the switch units may be configured as other well-known switch units. For example, another semiconductor switching device or a mechanical relay may be used, for example. Also, the number of devices included in each of the first switch unit and the second switch unit is not limited to two, and may be one or three or more as long as the switch units are configured to be able to block a current flowing in either direction.

The embodiments above show examples in which the output voltage of the second power supply unit in a fully-charged state is smaller than the output voltage of the first power supply unit in a fully-charged state. However, in any of the examples in the present Description, the output voltage of the second power supply unit in a fully-charged state may be approximately equal to or greater than the output voltage of the first power supply unit in a fully-charged state.

In the embodiments above, the first power supply unit and the load are connected to the first conductive path. However, the present disclosure is not limited to such a configuration, and other electrical components such as a generator and another load may be electrically connected to the first conductive path. Also, the positions at which these electrical components are connected may be various positions as long as the electrical components are electrically connected to the first conductive path at the positions.

The invention claimed is:

1. A power supply device comprising:
   a first conductive path that is a path for power between an on-board first power supply unit and a load;
   a second conductive path that is connected to the first conductive path and to an on-board second power supply unit that is chargeable and dischargeable;
   a first switch unit that is provided on the first conductive path between a connection part, at which the first conductive path is connected to the second conductive path, and the first power supply unit, and switches to an electrically disconnected state, in which the first switch unit blocks a current from flowing in either direction, and to an electrically connected state, in which the first switch unit allows a current to flow therethrough;
   a second switch unit that is provided on the second conductive path between the connection part and the second power supply unit, and switches to an electrically disconnected state, in which the second switch unit blocks a current from flowing in either direction, and to an electrically connected state, in which the second switch unit allows a current to flow therethrough;
   a control unit that controls respective switching operations of the first switch unit and the second switch unit;
   a first voltage detection unit that detects a voltage value at a position on the first conductive path between the first power supply unit and the first switch unit;
   a second voltage detection unit that detects a voltage value at a position on the second conductive path between the second switch unit and the second power supply unit; and
   a current detection unit that detects a current value at a position on the first conductive path between the connection part and the load, wherein, in a normal state, the control unit performs control to bring the first switch unit into an ON state and the second switch unit into an OFF state, and control to bring the first switch unit into an ON state and the second switch unit into an ON state, the normal state being a state in which the current value of a current flowing through the first conductive path, detected by the current detection unit, is smaller than a predetermined current threshold value, the voltage value detected by the first voltage detection unit is within a normal range, and the voltage value detected by the second voltage detection unit is in a normal range, in a first abnormal state, the control unit brings the first switch unit into an OFF state and the second switch unit into an OFF state, the first abnormal state being a state in which the current value of a current flowing through the first conductive path, detected by the current detection unit, is greater than the current threshold value, in a second abnormal state, the control unit brings the first switch unit into an OFF state and the second switch unit into an ON state, the second abnormal state being a state in which the current value of a current flowing through the first conductive path, detected by the current detection unit, is smaller than the current threshold value, and the voltage value detected by the first voltage detection unit is no greater than a predetermined first lower limit voltage threshold value, in a third abnormal state, the control unit brings the first switch unit into an OFF state and the second switch unit into an ON state, the third abnormal state being a state in which the current value of a current flowing through the first conductive path, detected by the current detection unit, is smaller than the current threshold value, the voltage value detected by the second voltage detection unit is no less than a predetermined overvoltage threshold value, and in a fourth abnormal state, the control unit brings the first switch unit into an ON state and the second switch unit into an OFF state, the fourth abnormal state being a state in which the current value of a current flowing through the first conductive path, detected by the current detection unit, is smaller than the current threshold value, the voltage value detected by the first voltage detection unit is within the normal range, and the voltage value detected by the second voltage detection unit is no greater than a predetermined second lower limit voltage value.

2. The power supply device according to claim 1, wherein the first conductive path is electrically connected to a fuse unit that blocks a current from flowing between the first power supply unit and the first switch unit upon the first conductive path coming into a predetermined overcurrent state.

3. The power supply device according to claim 2, wherein the first voltage detection unit detects a voltage value across a conductive path between the fuse unit and the first switch unit.

4. The power supply device according to claim 1, further comprising:

a charging/discharging unit that performs a discharging operation to convert an input voltage from the second power supply unit side, and to output the converted input voltage to the first conductive path side according to a switching operation of a switching device, and performs a charging operation to supply a charging current that is based on power from the first conductive path to the second power supply unit according to an operation of a switching device, wherein at least a part of the second switch unit is configured as a switching device of the charging/discharging unit.

5. The power supply device according to claim 2, further comprising:

a charging/discharging unit that performs a discharging operation to convert an input voltage from the second power supply unit side, and to output the converted input voltage to the first conductive path side according to a switching operation of a switching device, and performs a charging operation to supply a charging current that is based on power from the first conductive path to the second power supply unit according to an operation of a switching device, wherein at least a part of the second switch unit is configured as a switching device of the charging/discharging unit.

6. The power supply device according to claim 3, further comprising:

a charging/discharging unit that performs a discharging operation to convert an input voltage from the second power supply unit side, and to output the converted input voltage to the first conductive path side according to a switching operation of a switching device, and performs a charging operation to supply a charging current that is based on power from the first conductive path to the second power supply unit according to an operation of a switching device, wherein at least a part of the second switch unit is configured as a switching device of the charging/discharging unit.

* * * * *